United States Patent
Smith et al.

[11] Patent Number: 6,032,323
[45] Date of Patent: Mar. 7, 2000

[54] COMBINED CONVEX/FLAT MIRROR AND WIPER ASSEMBLY WITH ADJUSTERS

[76] Inventors: Darrel L. Smith, 14611 NW. 16th Ave., Citra, Fla. 32113-2905; Donnie Knight, P.O. Box 11388, Tampa, Fla. 33680

[21] Appl. No.: 08/987,113

[22] Filed: Dec. 8, 1997

Related U.S. Application Data

[60] Provisional application No. 60/057,032, Aug. 6, 1997.
[51] Int. Cl.⁷ ...................................................... A47L 1/00
[52] U.S. Cl. .................................. 15/250.003; 15/250.04; 15/250.24; 15/250.26; 15/250.29; 359/864; 359/872; 359/873; 359/877
[58] Field of Search ........................ 15/250.003, 250.04, 15/250.24, 250.26, 250.29; 359/864, 872, 873, 877, 874, 876

[56] References Cited

U.S. PATENT DOCUMENTS

| | | |
|---|---|---|
| 1,035,796 | 8/1912 | Lamb et al. . |
| 2,648,087 | 8/1953 | Kiker . |
| 2,814,823 | 12/1957 | Werner . |
| 2,913,754 | 11/1959 | Vander Zee . |
| 2,987,937 | 6/1961 | Sala . |
| 3,522,584 | 8/1970 | Talbot . |
| 3,685,087 | 8/1972 | Pittman ............................... 15/250.003 |
| 4,037,286 | 7/1977 | Medearis et al. . |
| 4,094,591 | 6/1978 | Lafont ...................................... 359/876 |
| 4,271,381 | 6/1981 | Munz et al. . |
| 4,320,554 | 3/1982 | Tamura et al. ...................... 15/250.003 |
| 4,325,609 | 4/1982 | Alford ...................................... 359/864 |
| 4,336,482 | 6/1982 | Goertler et al. . |
| 4,457,597 | 7/1984 | DeGideo . |
| 4,459,718 | 7/1984 | Hewitt et al. . |
| 4,498,738 | 2/1985 | Kumai ...................................... 359/877 |
| 4,504,117 | 3/1985 | Mittelhauser ........................... 359/877 |
| 4,640,590 | 2/1987 | Wunsch .................................... 359/877 |
| 4,653,136 | 3/1987 | Denison . |
| 4,672,708 | 6/1987 | Williams . |
| 4,699,478 | 10/1987 | Tsui et al. . |
| 4,728,870 | 3/1988 | Hirano et al. . |
| 4,763,381 | 8/1988 | Williams . |
| 4,873,740 | 10/1989 | Vahrenwald et al. . |
| 4,896,395 | 1/1990 | Bissell . |
| 4,936,669 | 6/1990 | Wun ......................................... 359/877 |
| 4,957,014 | 9/1990 | Burke . |
| 5,005,962 | 4/1991 | Edelman ................................. 359/864 |
| 5,166,833 | 11/1992 | Shyu ....................................... 359/864 |
| 5,179,758 | 1/1993 | Smith et al. . |
| 5,203,050 | 4/1993 | Han . |
| 5,353,466 | 10/1994 | Smith et al. . |
| 5,522,112 | 6/1996 | Tiffany, III ......................... 15/250.003 |

FOREIGN PATENT DOCUMENTS

| | | |
|---|---|---|
| 1015830 | 4/1950 | France . |
| 2065459 | 7/1981 | United Kingdom . |

OTHER PUBLICATIONS

Spenco, Inc., "Mirror Safety Wiper" Month, Year Unavailable.

*Primary Examiner*—Robert J. Warden, Sr.
*Assistant Examiner*—Kaj K. Olsen
*Attorney, Agent, or Firm*—Saliwanchik, Lloyd & Saliwanchik

[57] ABSTRACT

An exterior rearview mirror assembly is provided for use on a vehicle which includes a rearview mirror, a wiper assembly and adjusters for the mirror. The wiper assembly includes a wiper arm base located behind the mirror assembly extending over the top of the mirror to attach to a resilient wiper arm having a wiper blade. The wiper arm base is attached to a threaded rod which, upon bi-directional rotation of the rod, causes the wiper arm base to laterally traverse across the mirror assembly, which in turn drives the wiper blade across the mirror. The adjusters are used to adjust the angular position of the mirror, or the entire mirror assembly, by utilizing spirally threaded rods which rotate bi-directionally to push or pull the mirror about certain pivot points.

9 Claims, 17 Drawing Sheets

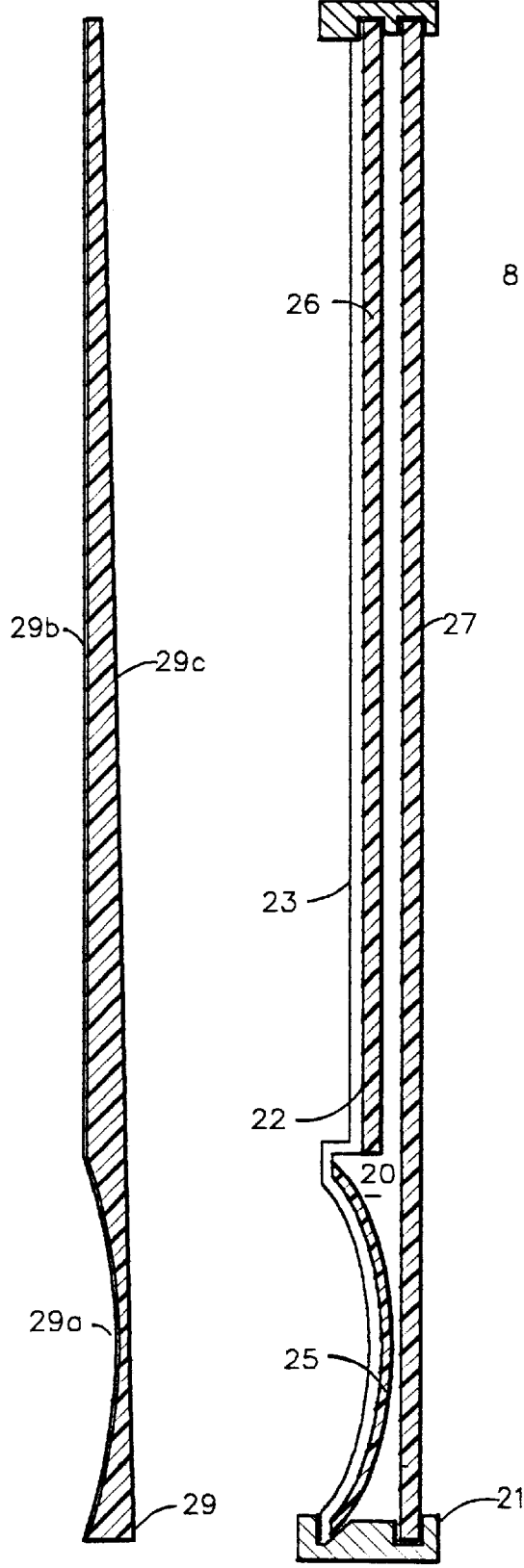
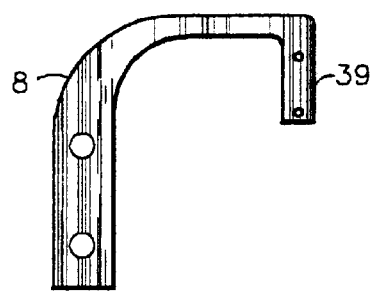
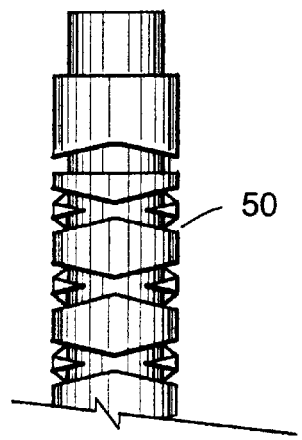

MATCH LINE 1

6,032,323

COMBINED CONVEX/FLAT MIRROR AND WIPER ASSEMBLY WITH ADJUSTERS

RELATED APPLICATIONS

This application claims priority from U.S. Provisional Application Ser. No. 60/057,032, filed Aug. 6, 1997, the whole of which is hereby incorporated by reference.

BACKGROUND OF THE INVENTION

This invention relates generally to wiping and specifically to wiping of rear view mirrors of vehicles such as trucks, buses, and similar vehicles and to adjustment of mirrors.

The use of wipers on the rear view mirrors of large commercial vehicles is a potential trend in the industry. Because of their length, it is especially important that trucks and buses have an excellent view of what is beside them. Unfortunately, heavy rainfall can obscure the view in a standard rear view mirror. Even a heated mirror does not help in heavy rainfall. If a dangerous circumstance suddenly presents itself in a vehicle's path, the driver might not be able to tell whether it is safe to change lanes left or right to avoid the danger. Therefore, having clean mirrors can prevent accidents and save lives.

Many patents have been issued on various inventions related to wiping of rear view mirrors. Yet it is still a rare sight to see a vehicle equipped with any of these inventions. In the absence of regulations mandating wipers on the external rear view mirrors of large commercial vehicles, the popularity and commercial success of such wipers can be expected to be highly price sensitive.

Two notable patents, U.S. Pat. No. 5,179,758 and U.S. Pat. No. 5,353,466, assigned to the assignee of the present application address some of the problems in the industry and are incorporated herein by reference. The problem with the wiper assembly disclosed in these patents is that the wiper cannot be used if a convex mirror is attached to the face of the mirror and neither of these mirrors provide for electric adjustment.

BRIEF SUMMARY OF THE INVENTION

The present invention utilizes a single piece of glass with an elliptical shaped carved out to form a wider view to the driver of any vehicle. This rectangular piece of glass may have one or two elliptical shapes carved out of the back of the glass so the front of the glass remains flat and can be wiped clean to provide a clear viewing surface of both mirrors.

The rectangular shaped glass with the elliptical shape or shapes carved out of the back may then be painted to provide a reflective viewing surface, i.e., a mirror, so that when front is clean by the unique wiper mechanism both reflective surfaces are useful. This glass arrangement and means to clean it provide a substantially improved rearview mirror over the prior art. The mirror assembly of the present invention also provides for adjustment of the mirror utilizing a novel adjustment means.

Specifically, in a preferred embodiment, the present invention provides an exterior rearview mirror assembly for use on a vehicle, having a rearview mirror with at least one flat reflective surface and at least one convex reflective surface; and a substantially flat exposed outer surface over the reflective surfaces; a wiper assembly attached to the rearview mirror including at least one flexible wiper blade for wiping the outer surface of said rearview mirror, a driver for bidirectionally driving the wiper blade across the flat outer surface; and a source of power for applying electric power to the driver.

In one embodiment, the convex reflective surface and the flat reflective surface are made from a single piece of translucent material with a reflective coating applied to an underside thereof In another embodiment, the convex reflective surface is mounted along the same plane as the flat reflective surface, and a single piece of translucent material extends over the reflective surfaces to provide the substantially flat outer surface.

The mirror assembly also includes a wiper blade attached to a wiper arm base. The wiper arm base is preferably located behind the mirror, securely encased within a housing. The wiper arm base is attached to a bidirectional moveable device driven by the driver. In one embodiment, the bidirectional moveable device is composed of at least one spirally threaded rod inserted through a counter-threaded hole within the wiper arm base, and a gear. The gear provides bidirectional rotation to the rod, causing the wiper arm base to traverse across the rod. A pair of contacts are mounted along the rod near each end of the rod such that upon the base reaching either end while traversing the rod, one of the contacts is activated, causing the driver to reverse direction of the gear, thereby reversing rotational direction of the rod and reversing direction of the wiper arm base, periodically causing the blade attached thereto to traverse back and forth across the flat outer surface in a wiping manner.

In another embodiment, the bidirectional moveable device is composed of a pulley assembly to which the wiper arm base is securely attached and at least one rod inserted through the base to maintain the base along a straight path such that the pulley provides lateral movement to the base across the rod. A pair of contacts are located near each end of the rod such that upon the base reaching either end while traversing the rod, one of the contacts is activated, causing the driver to reverse direction of the pulley assembly thereby causing the wiper arm base to reverse direction on the rod, periodically causing the blade attached thereto to traverse back and forth across the flat outer surface in a wiping manner.

The mirror assembly also includes a device for adjusting the angular position of the mirror. In one embodiment, the adjustment device comprises a pair of adjusters located at right angles from a pivot point to provide both horizontal angular movement and vertical angular movement from the pivot point. Each of the adjusters comprises a spirally threaded rod inserted through a counter-threaded hole of a connector arm attached to the mirror; a driver attached to a stationary point of the mirror assembly to provide bidirectional rotational movement to the rod, such that the connector arm laterally traverses the rod upon rotation of the rod in opposing directions depending on the rotational direction of the rod, thereby pushing or pulling the mirror about the pivot point to change the angular position of the mirror. The driver for each adjuster comprises a belt driven gear attached to a single bidirectional motor to provide rotation to each driver which in turn provides bidirectional rotation to the rods. In an alternate embodiment, the driver for each adjuster comprises a bidirectional motor which rotates a series of gears which in turn provide bidirectional rotation to the rods.

In a preferred embodiment, the mirror adjuster is an adjuster mounted to one side of a pair of vertically aligned pivot connectors to provide vertical angular adjustment of the mirror. The adjuster comprises a spirally threaded rod inserted through a counter-threaded hole of a connector arm attached to the mirror, and a driver attached to a stationary point of the mirror assembly, the driver providing bidirectional rotational movement to the rod, such that the connector arm laterally traverses the rod upon rotation of the rod in opposing directions depending on the rotational direction of the rod, thereby pushing or pulling the mirror about the pivot connectors to change the angular position of the mirror.

In an alternate embodiment, the adjuster is mounted to the mirror assembly and a connector arm mounted to an arm of the mirror assembly and a stationary pivot point at the point where the mirror assembly attaches to the arm; the adjuster comprising a spirally threaded rod inserted through a counter-threaded hole of the connector arm, the adjuster further comprising a driver to provide bidirectional rotational movement to the rod, such that the connector arm laterally traverses the rod upon rotation of the rod in opposing directions depending on the rotational direction of the rod, thereby pushing or pulling the entire mirror assembly about the pivot point in the arm to change the angular position of the mirror assembly.

In another embodiment, the mirror adjustment assembly for adjusting the angular position of a mirror comprises at least one adjuster mounted to a stationary point of the mirror assembly, the adjuster comprising a spirally threaded rod inserted through a counter-threaded hole in a connector arm; the connector arm mounted to the mirror in a spaced relation to a pivot point of the mirror; the adjuster further comprising a driver to provide bidirectional movement to the rod, such that the connector arm laterally traverses the rod upon rotation of the rod in opposing directions depending on the rotational direction of the rod, thereby pushing or pulling the mirror about the pivot point to change the angular position of the mirror. In one embodiment, the mirror adjustment assembly includes two adjusters mounted at right angles to the pivot point to provide both horizontal angular movement and vertical angular movement of the mirror about the pivot point, and the driver is a bidirectional motor which drives a series of gears attached to the rod.

BRIEF DESCRIPTION OF THE DRAWINGS

Listing of Reference Numerals 1 mirror assembly
2 wiper arm
3 wiper blade
4 arm support
5 water sprayer
6 external back cover of mirror assembly
7 water stoppers
8 wiper arm base
9 threaded control rod
10 back side of mirror
11 clutch motor
12 bidirectional electric motor
13 belt
14 convex indentation in mirror back
15 adjuster assembly
15a spirally threaded shaft
15b grooved connector arm
15c connector
16 control rod
19 mirror edge extension
20 laminated glass/mirror assembly
21 edge seal
22 heat element
23 mirror back
25 convex mirror
26 flat mirror
27 flat glass face
29 complete mirror assembly
29a convex mirror portion
29b flat mirror portion
29c flat front surface of mirror
30 worm gear
31 worm
32 motor shaft
33 motor
34 electrical contact
35 bi-tooth gear
36 timing belt
37 movement allowance in connector
39 extension
40 pulley
41 movement point
42 movement point
43 pivot point (metal rod)
44 motor
45 connector
50 helically threaded shaft
56 movement point
58 mirror assembly
60 arm
62 pins
64 support
70 adjuster
71 motor
72 spirally threaded shaft
73 grooved connector arm
74 connector frame
75 connector
76 shaft out of motor
77 gearing connected to shaft
78 tooth gear connected to shaft (72)
80 adjuster assembly
81 connector pivot point)
90 adjuster assembly
91 motor
92 spirally threaded shaft
93 grooved connector arm
94 connector frame
95 connector
96 spirally threaded shaft
97 gear connected to shaft (96) and motor (91)
98 gear

FIG. 3 is a cross-sectional view of a single piece mirror in one embodiment of the present invention.

FIG. 4 is a cross-sectional view of a laminated glass and multi-piece mirror in an alternate embodiment of the present invention.

FIG. 5 is a side view of one embodiment of the wiper arm base of the present invention.

FIG. 11b is a side sectional view of the mirror assembly of FIG. 11a.

FIG. 14c is an electrical schematic taken along matchlines 1 and 2 of FIG. 14a.

FIG. 14d is an electrical schematic taken along match line 2 of FIG. 14a.

FIG. 14e is an electrical schematic taken along match line 1 of FIG. 14a.

FIG. 15 shows the helically threaded shaft.

DETAILED DISCLOSURE OF THE INVENTION

Figure 1:
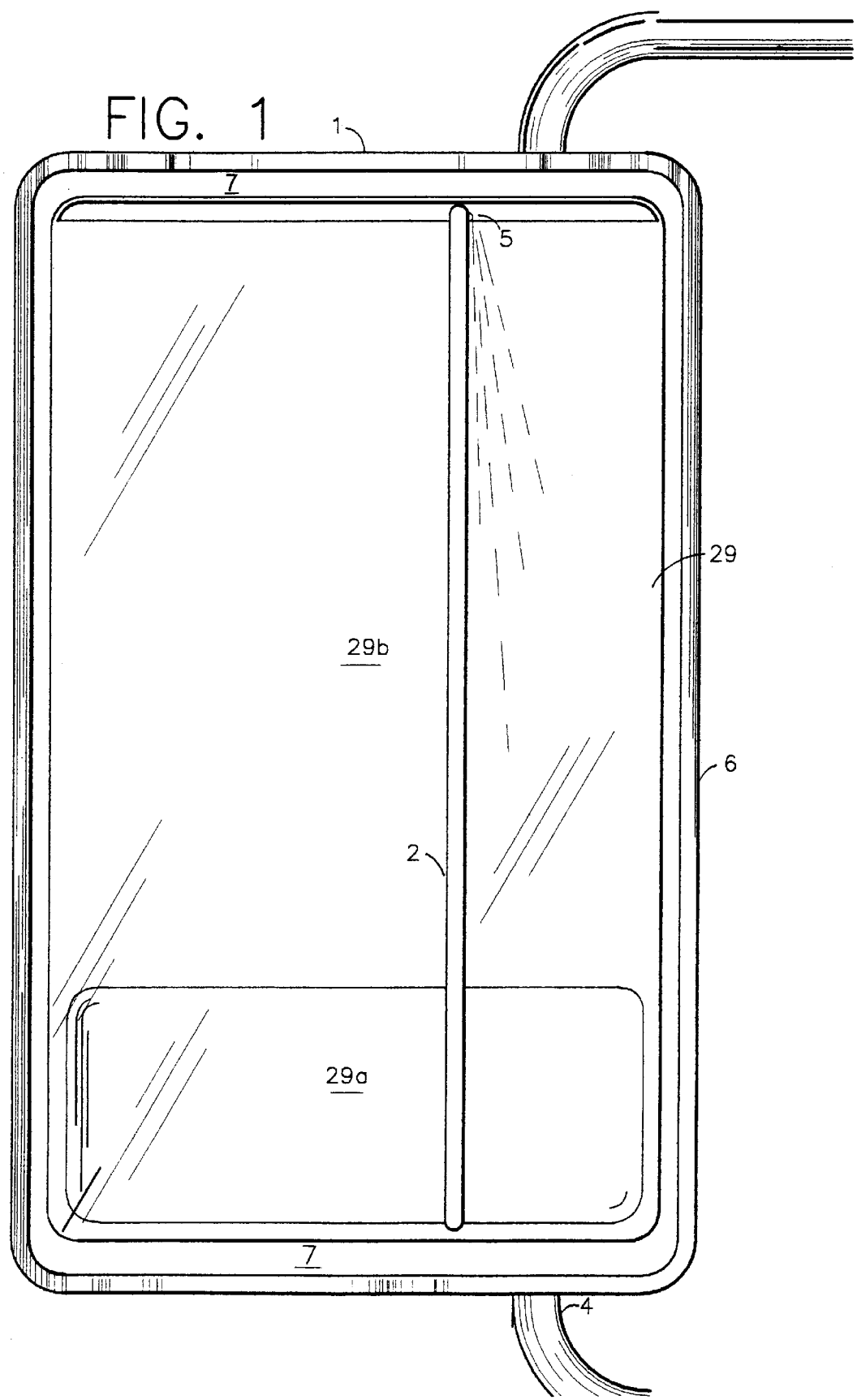
FIG. 1 is a front view of the combined convex/flat mirror and wiper device of the present invention, hereinafter referred to as the mirror assembly.

Turning now to FIG. 1 wherein like numerals represent like elements throughout several views, the mirror assembly 1 of the present invention is shown. The mirror assembly is designed for use external to the vehicle such as a truck or bus, and may be attached to either or both sides with arm supports 4. Since the mirror assembly 1 is external to the vehicle, it is subject to environmental conditions such as rain, dirt, dust and road debris. The mirror assembly includes a wiper arm 2 to clean the exterior surface 29c of the mirror assembly 1. A sprayer 5 for spraying water or another cleaning solution may be located on an upper portion of the wiper arm 2. The sprayer 5 may tap off the window washer fluid system already present under the hood of most vehicles. The driver sprays the mirror whenever desired. At the manufacturer's option, the windshield washer control can activate the rearview mirror sprayer also. This eliminates the need for separate pumps and controls. Otherwise, a separate pump and control can be provided. The wiper arm 2 has attached along its length between the arm 2 and the mirror surface 29c a wiper blade 3 or squeegee.

Figure 2:
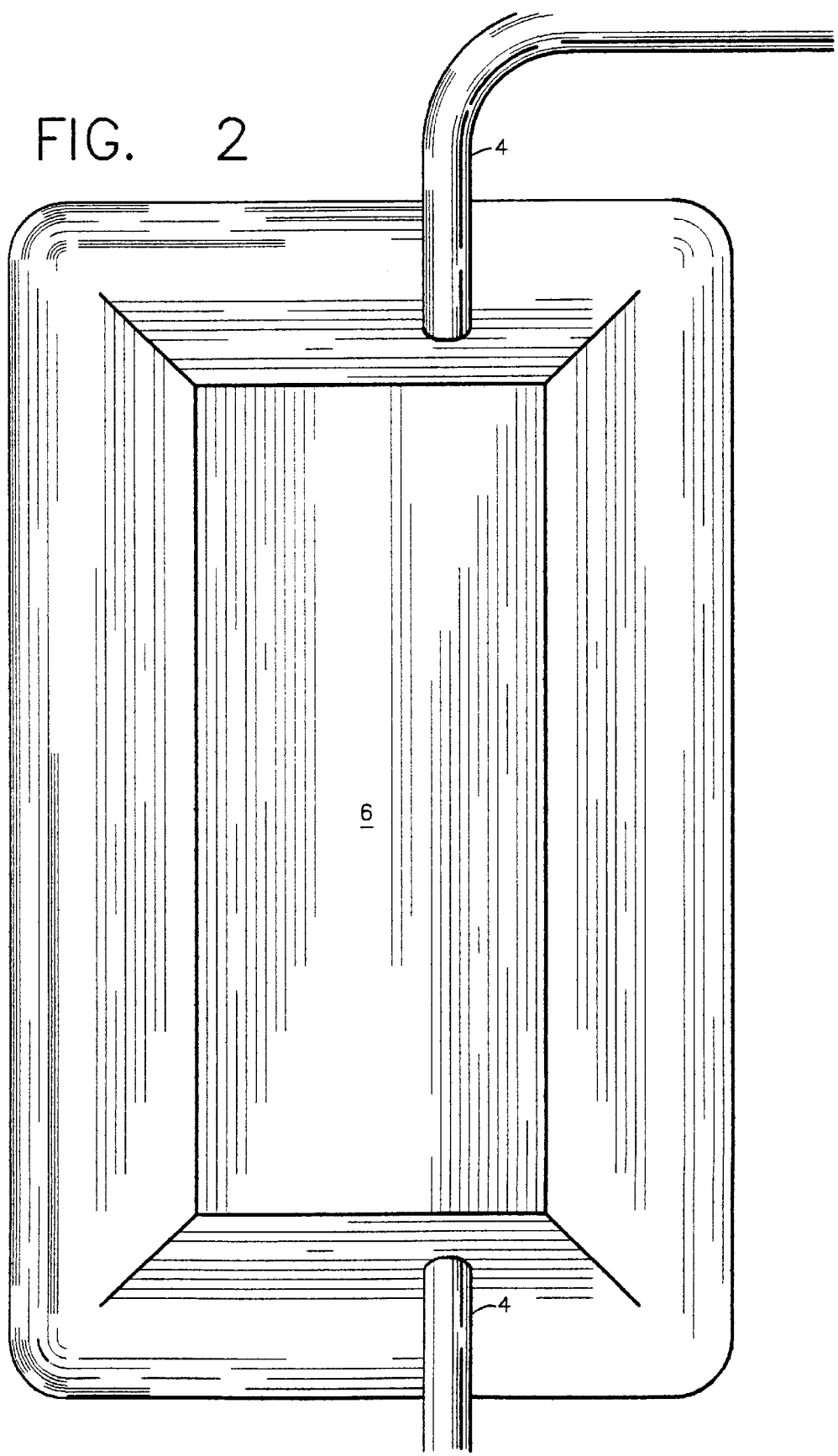
FIG. 2 is a back view of the mirror assembly of the present invention.

FIG. 1 shows the preferred mounting of the wiper, vertically. However, alternate mounting positions, such as horizontally are contemplated herein. One advantage of having the wiper arm 2 mounted vertically, as shown, is that gravity will cause rain water to run down the length of the wiper blade 3. The water automatically gets out of the way. Another advantage of a vertically mounted wiper arm 2 is that when it blocks one eye's view, the other eye can often see around it. The wiper arm 2 is designed to move along a straight path. It will move horizontally from side to side if mounted vertically or move vertically from top to bottom if mounted horizontally. Water stoppers 7 are located along the inside edge of the cover 6 (FIG. 2) and extend to the outer edge of the mirror 29 and mirror edge extensions 19.

Turning now to FIG. 3, in a preferred embodiment, the mirror 29 is a single piece of reflective surfacing made of glass or other materials which are translucent with reflective backing or are entirely reflective in nature. The mirror 29 has combined a flat surface 29b for reflecting a normal image and a convex surface 29a which curves outward to provide a wide-angle reflective surface along its back side. The mirror 29 has a continuous flat face 29c along the front, exposed side. The continuous flat face 29c on the exposed side may be easily and thoroughly cleaned by the wiper blade 3 since there are no pockets, indentations or seams between the flat surface 29c and the convex surface 29a.

In an alternate embodiment shown in FIG. 4, a multi-piece mirror assembly 20 is shown. This embodiment comprises a flat mirror 26 and a convex mirror 25 along the same vertical plane with a single piece of translucent face material 27 such as glass extending over both mirrors to provide a flat face 27 on the exposed side. This assembly may be laminated A seal 21 of plastic, rubber or like material is located around the outer edges of both the mirrors 25, 26 and glass face 27 to prevent water or moisture from entering between the glass 27 and the mirrors 25, 26. A heating element 22 may be attached to the back of the mirror(s) 29, 20 for defrosting and defogging.

Turning now to FIG. 5 the wiper arm base 8 is shown. Extension 39 connects the wiper arm base 8 to the wiper arm 2. The wiper arm base 8 includes at least one hole, preferably two through which threaded control rods 9 (FIG. 6) or non-threaded control rods 16 (FIG. 9, 11a), or a combination thereof may be inserted. The wiper arm base 8 extends over the top of the mirror 29 (or 20) such that extension 39 is exterior to the assembly for securing the wiper arm 2 against the exposed side of the mirror.

Figure 6:
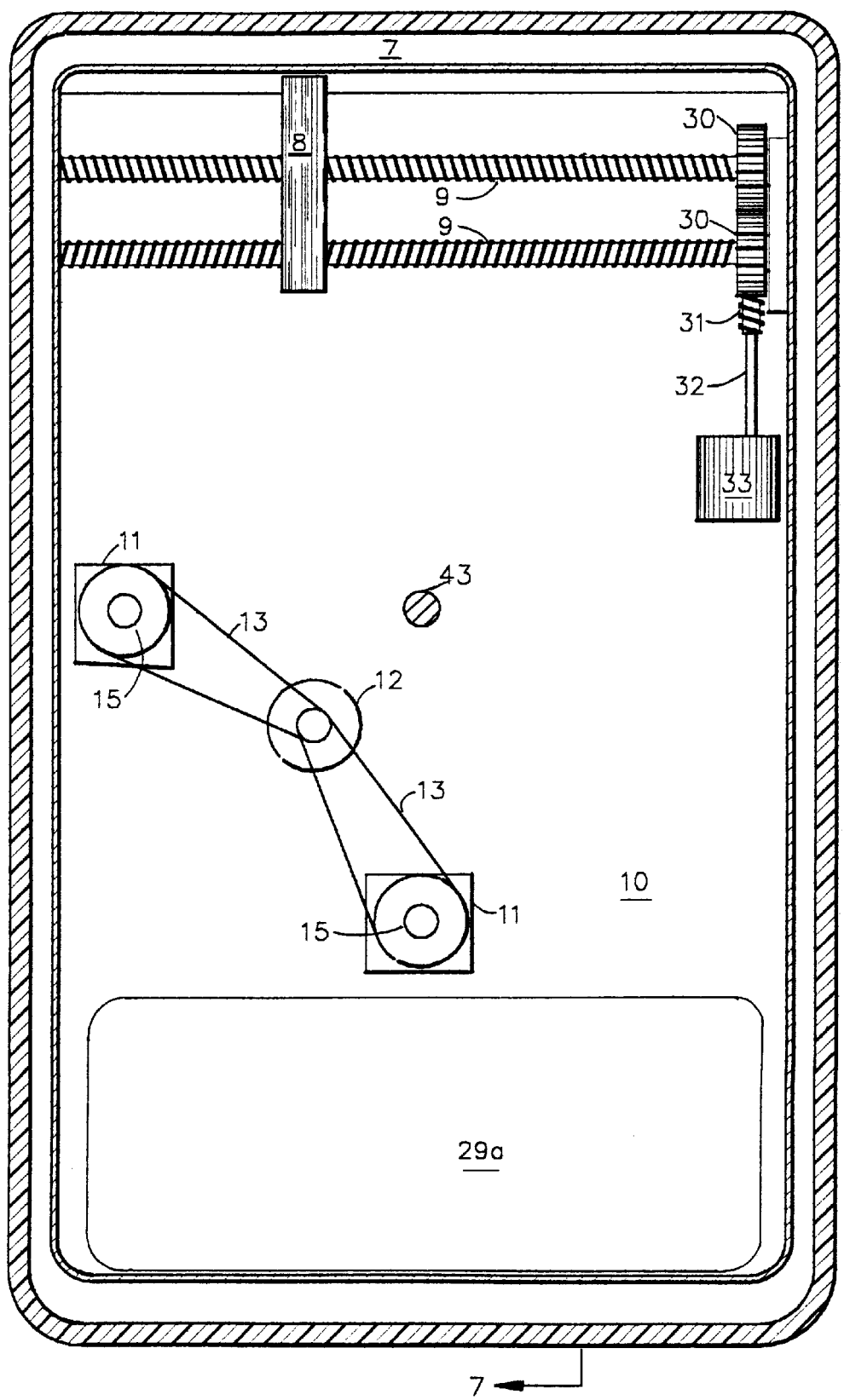
FIG. 6 is a back view of the mirror assembly with the back cover removed.
Figure 7:
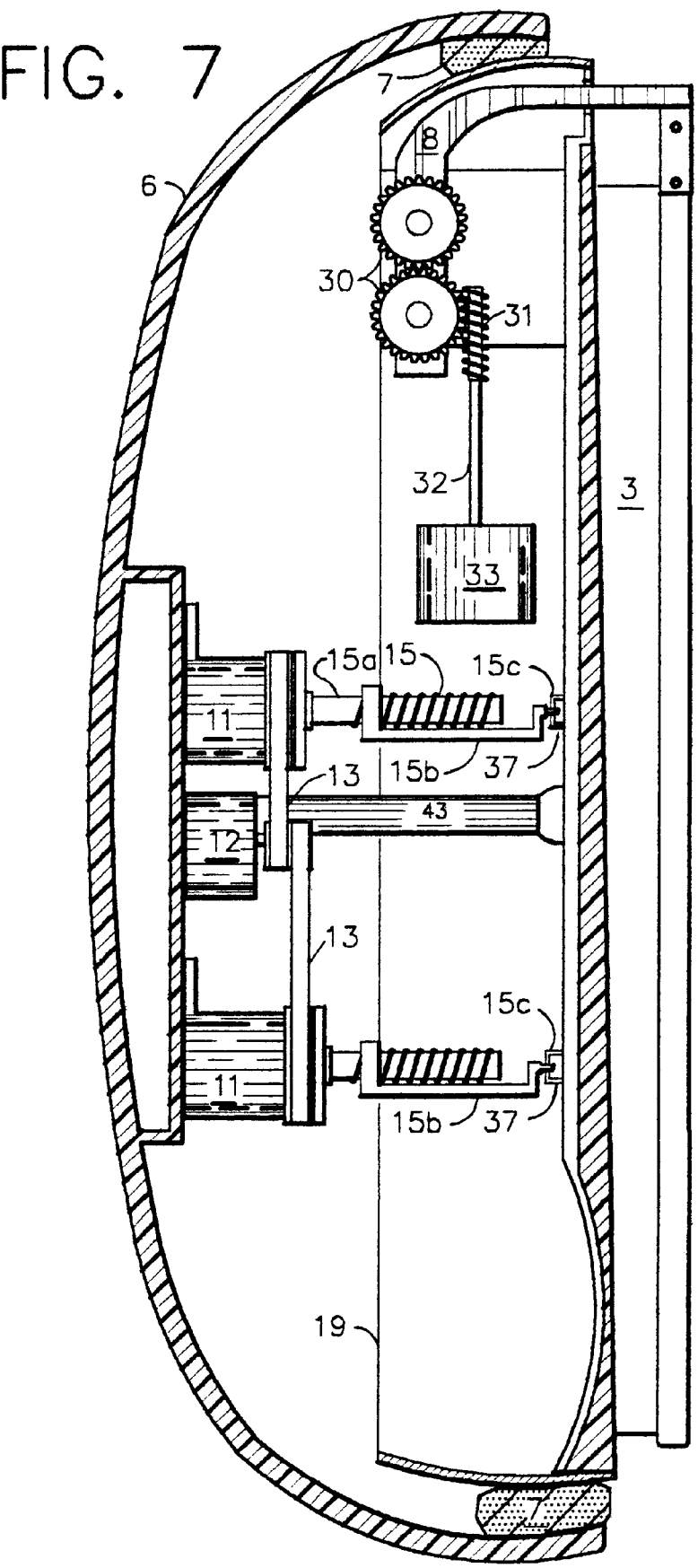
FIG. 7 is a side sectional view of the mirror assembly taken along lines 7—7 of FIG. 6 showing the inner workings of the mirror assembly, including the adjusters.
Figure 8:
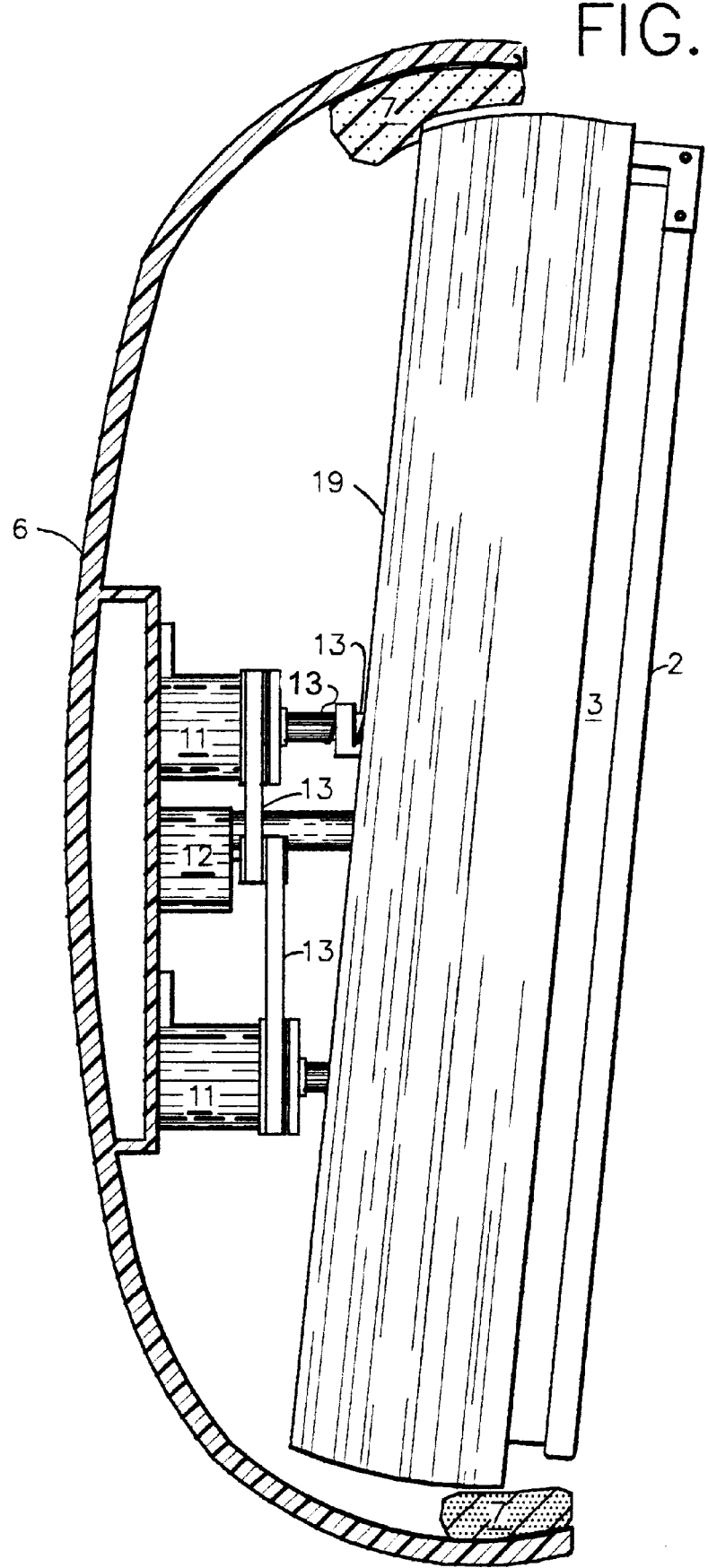
FIG. 8 is a side sectional view of the mirror assembly showing adjustment of the mirror with the adjusters.

Turning now to FIG. 6, the inner workings of the mirror assembly are shown from the back with the back cover 6 removed. The back side 10 of the mirror assembly preferably made of tin or other suitable material such as other metals or plastics has a convex indentation 29a to provide the convex reflecting surface. Multiple convex reflecting surfaces may be provided as desired. The wiper arm base 8 is located near the top of the assembly. Two control rods 9 extending horizontally across the assembly run through the wiper arm base 8. Such rods are preferably approximately ¼ inch to ⅜ inch in diameter. One or both of these rods 9 may be a spirally threaded shaft (worm). Preferably, two rods 9 are utilized to help stabilize the wiper arm base 8. The threaded shaft rods 9 mesh into a wheel with marginal teeth, e.g., worm gear 30. The worm gear 30 and rods 9 drive the wiper arm base 8. The worm gear 30 is attached to another spirally threaded shaft (worm 31) attached to a shaft 32 and motor 33 or other driving means. As the motor 33 drives the worm 31 into the worm gear 30, the control rods 9 cause the wiper arm base 8 to move horizontally across the mirror assembly. As shown in FIG. 8, this causes the wiper arm 2 and blade 3 to wipe the exposed surface of the mirror. The backside 10 of the mirror is preferably a thin piece of tin approximately ⅟16 inch thick upon which the mirror is laid flat against. FIG. 6 also shows the adjuster assembly 15 which will be described in more detail hereafter. FIG. 7 shows a cross-sectional view taken along lines 7—7 of FIG. 6.

Figure 9:
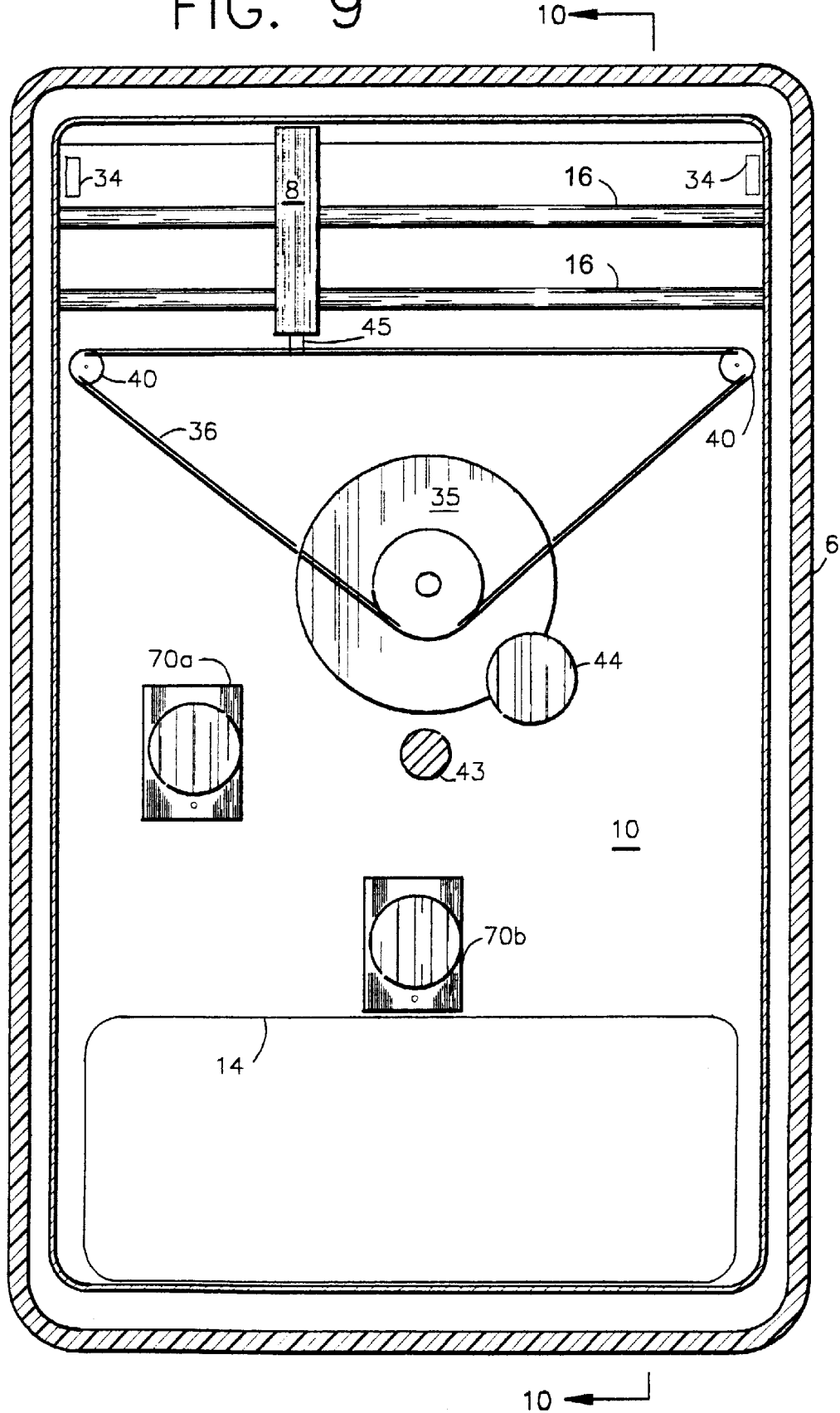
FIG. 9 is a back view of the mirror assembly embodiment of the laminated glass and multi-piece mirror with the back cover removed.
Figure 10:
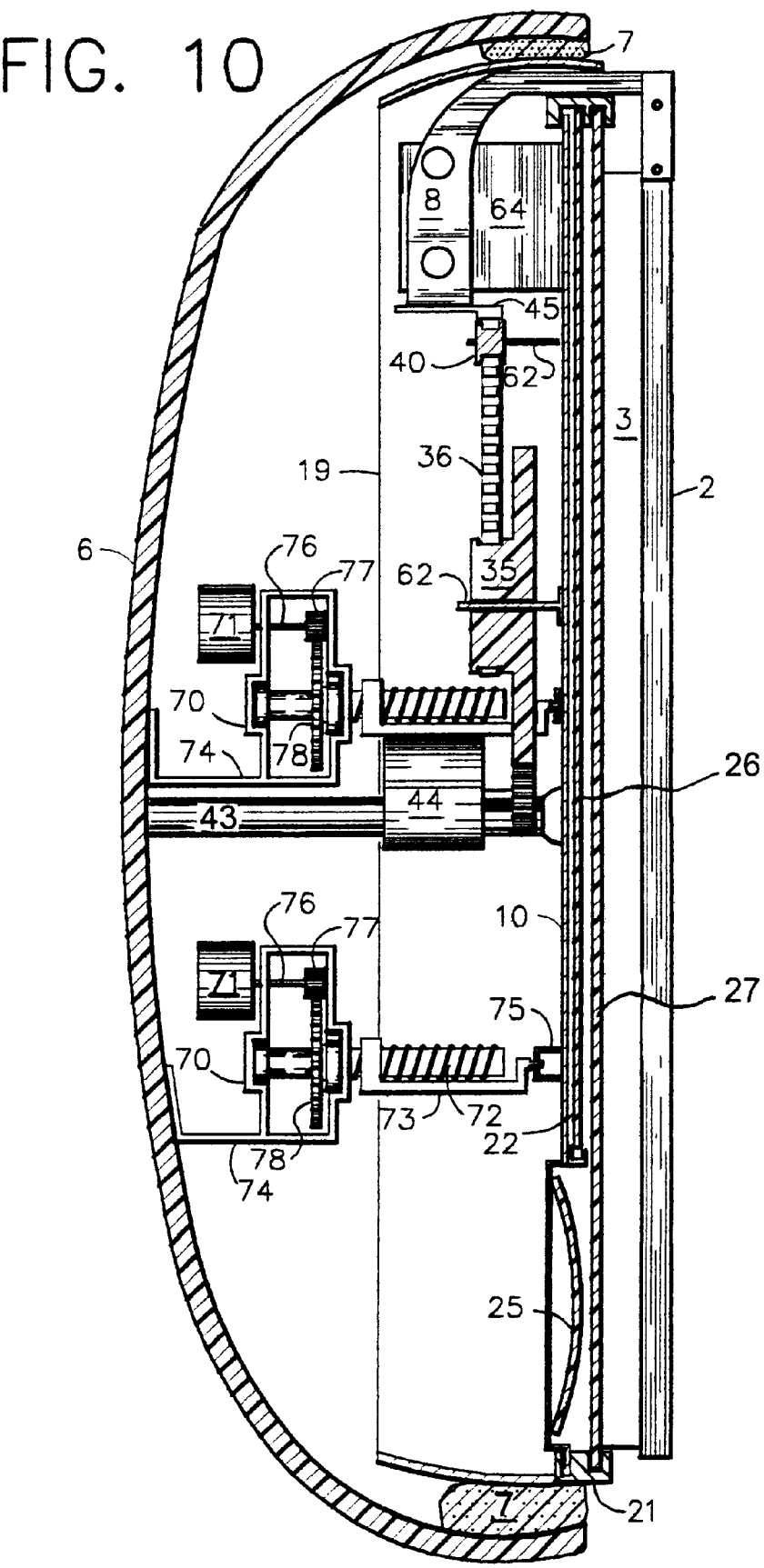
FIG. 10 is a side sectional view of the mirror assembly taken along line 10—10 of FIG. 9 showing the inner workings of the mirror assembly, including the adjusters.

FIGS. 9 and 10 show an alternate pulley assembly for driving the wiper arm base. A plastic gear 35 is provided with both timing belt teeth and gear teeth making it a bitooth gear. The timing belt 36 runs through the gear 35 and around two oppositely spaced pulleys 40. Motor 44 drives gear 35 which drives the timing belt 36. Pins 62 connect the pulley assembly to the mirror. In a preferred embodiment, the wiper motor is a bidirectional direct current motor. It is powered by a direct current electric power control that periodically changes polarity. Each change in polarity causes a change in the direction of the wiper's motion and begins a new half cycle. The driver controls the duration of time between half cycles with a multi-position frequency control. The timing belt 36 is attached to the wiper arm base 8 by a connector 45. As the belt 36 moves back and forth, the wiper arm base moves across the control rods 16 which causes the wiper arm 2 and blade 3 to wipe the exposed surface of the mirror. One of the two pulleys 40 keep the timing belt 36 in rotation. Electrical contacts 34 are located at opposing ends of the mirror assembly. As the arm base 8 travels across, it reaches one side and contacts one of the electrical contacts 34. This electrical contact 34 triggers a stop in power to the motor 44 which will allow the electronics to signal the motor 44 to reverse direction. In a preferred embodiment, a pair of normally closed momentary switches (not shown) are located in the assembly so that when one of these switches is activated the wiper reaches each end of its desired range of travel. Activating each switch opens one circuit that powers the motor's rotation in one direction only. This causes the wiper arm base 8 to stop until the beginning of the next half cycle when the polarity of electricity to the motor is reversed. If each half cycle is of short duration, the switches will normally not be reached during continuous operation. Nevertheless, they serve as a safety catch that protects the gears and other parts of the assembly. As the power control is set to longer durations (lower frequencies) each switch will be activated once per full cycle and the wiping will become intermittent. Thus, the presence of the wiper at each of two opposing extreme positions along said mirror is signaled and further travel in that direction is stopped. Every half cycle the wiper's position is automatically synchronized with the power control.

A mirror edge extension 19 is provided to keep a tight seal between the water stoppers 7 and the mirror 29 (or 20). Preferably, the mirror edge extensions 19 are made of plastic or metal and extend around the edge of a swivel mirror about 2.5" from the exposed surface of the mirror towards the back. This provides a seal between the water stoppers 7 and the mirror edge extensions 19 when the mirror is swivelled or adjusted.

Focusing now on FIGS. 6–8, adjustment of the mirror in one embodiment will now be discussed. When the mirror is to be adjusted, an adjuster button (not shown) is pushed. Activation of the adjuster button will engage the clutch motors 11. The clutch motors 11 are attached to a bidirectional electric motor 12 by belts 13. A pivot pole 43 is centrally located and consists of a metal rod which extends from the inside of the back cover 6 to the mirror back 10. The pivot pole 43 keeps the mirror suspended while the mirror is adjusted to the proper position or angle for viewing. The clutch motors 11 are connected to adjuster assembly 15 for adjusting the mirror. The adjuster assembly 15 comprises a spirally threaded shaft (worm) 15a which meshes into a grooved connector arm 15b attached by a connector 15c to the mirror. The motors which drive the adjusters are connected to the inside of the back cover 6. The connectors 37 are designed to allow the adjuster at the point of connection to slide up and down the connector 37 to compensate for the movement in angle change from parallel to obtuse. One of the adjusters 15 is located to one side of the pivot pole 43 and the other toward the bottom forming substantially a right angle between the adjusters and pivot pole. As shown in FIG. 8, as an example, the adjuster assembly 15 has positioned the mirror in a downward angle by utilizing the threaded shaft 15a (as it turns) to move the mirror in or out.

Alternately, FIGS. 9 and 10, two adjusters 70a, 70b connected to the back cover 6 of the mirror assembly by connectors 75 consist of a motor 71, which drives a shaft 76 which drives gear 77 which in turn meshes with toothed gear 78. Gear 78 causes the spirally threaded shaft 72 of the adjuster to turn, meshing with a grooved connector arm 73 connected to the mirror by connector 75. The entire assembly, is connected to the back cover 6 by connector frame 74. Pivot pole 43 is provided as previously described.

Figure 11A:
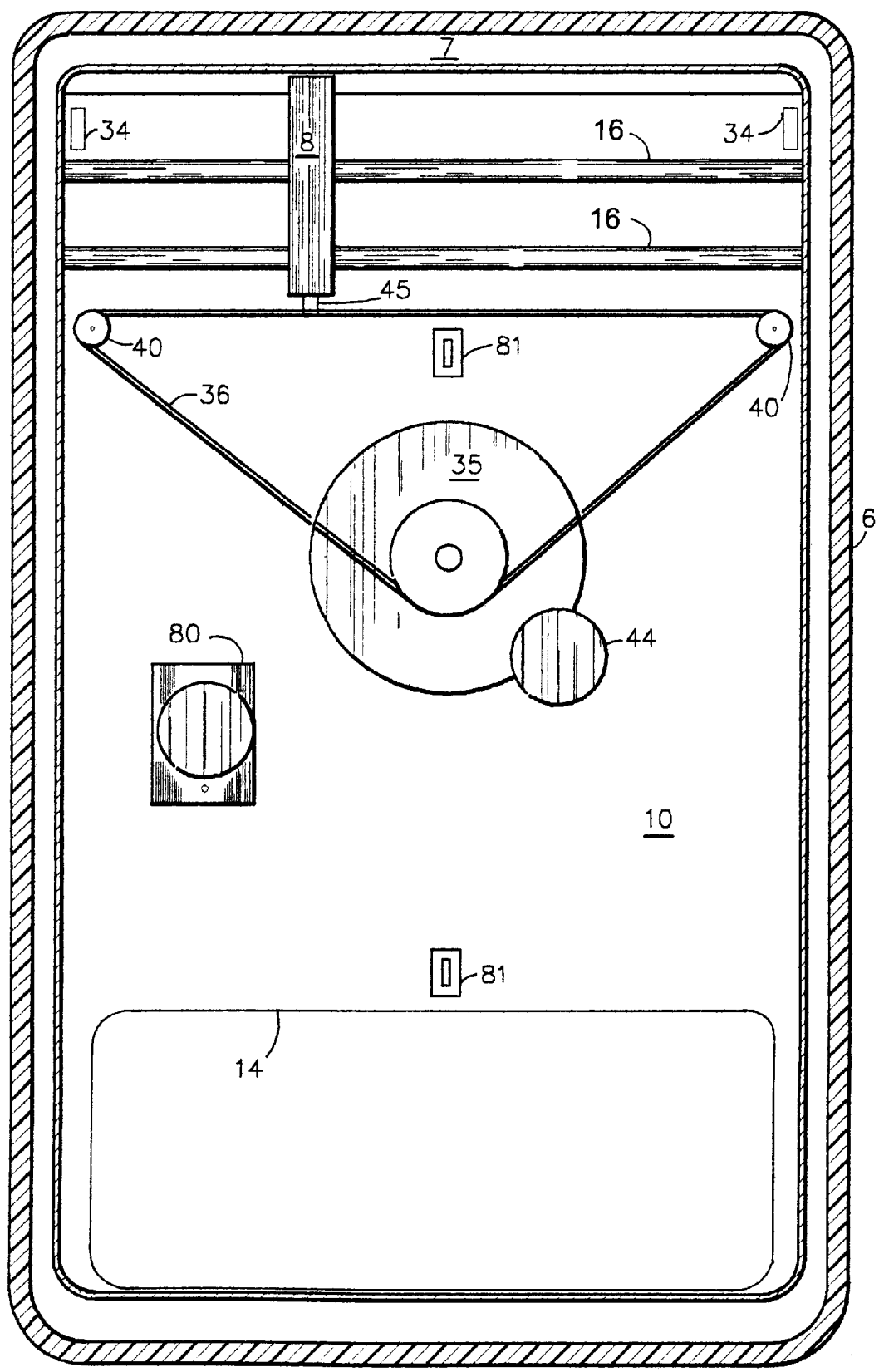
FIG. 11a is a back view of an alternate embodiment of the mirror assembly having only a single adjuster with the back cover removed.
Figure 11B:
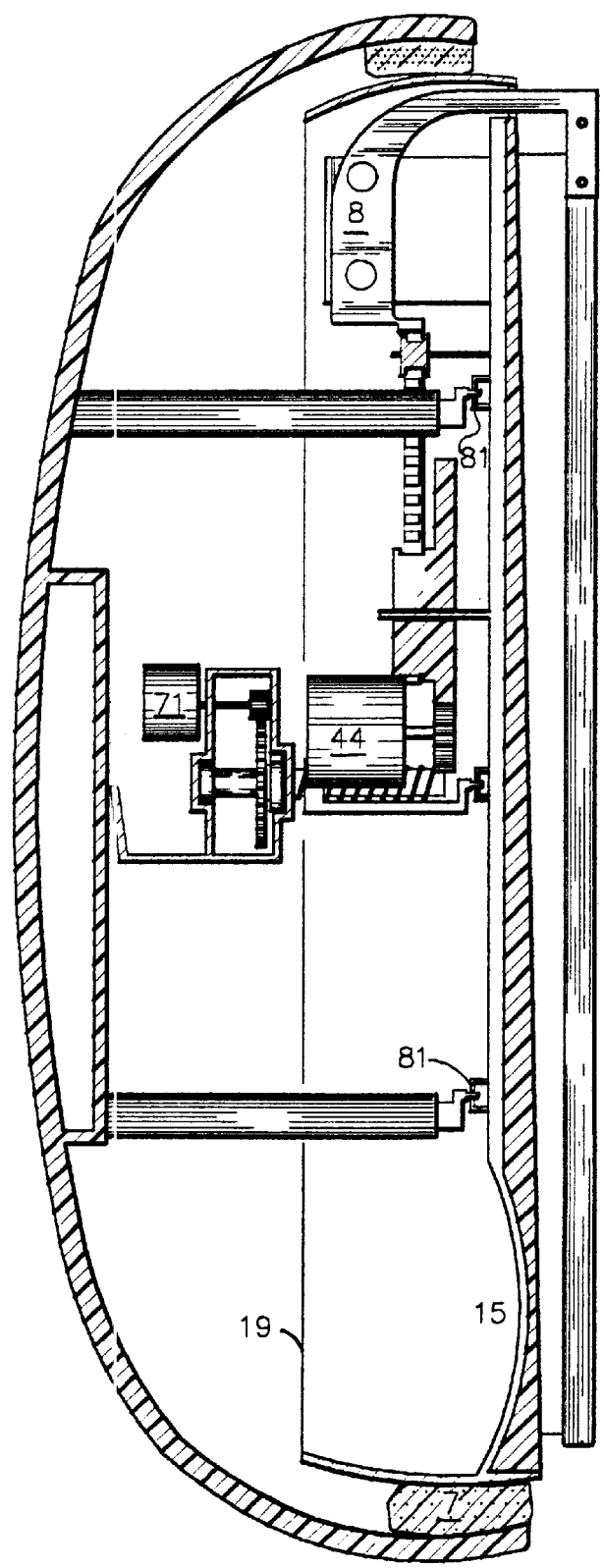

In an alternate embodiment shown in FIGS. 11a and 11b, a single adjuster 80 may be utilized with the same gearing as previously discussed. The single adjuster allows only left to right adjustment. Two connectors 81 provide the attachment of the adjuster 80 to the mirror at the necessary pivot points.

Figure 12:
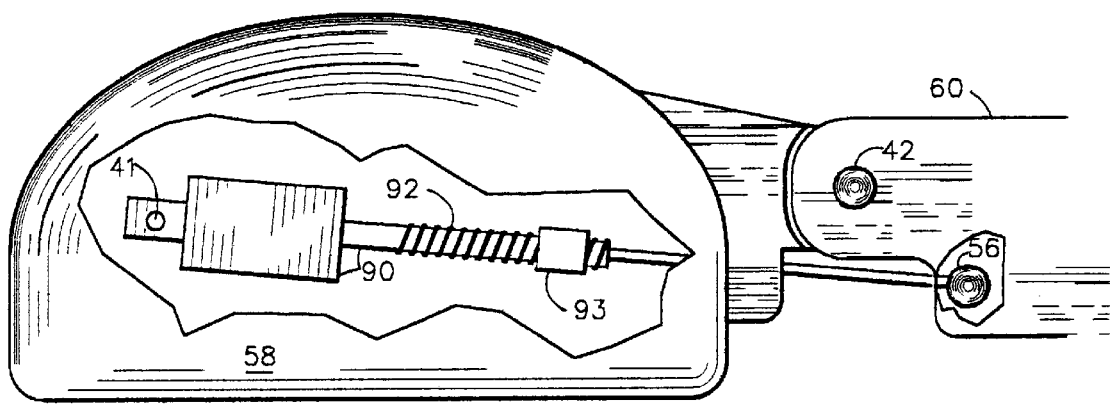
FIG. 12 is a top cut-away view of the mirror assembly showing a single adjuster located in the lower section of the mirror assembly.
Figure 13:
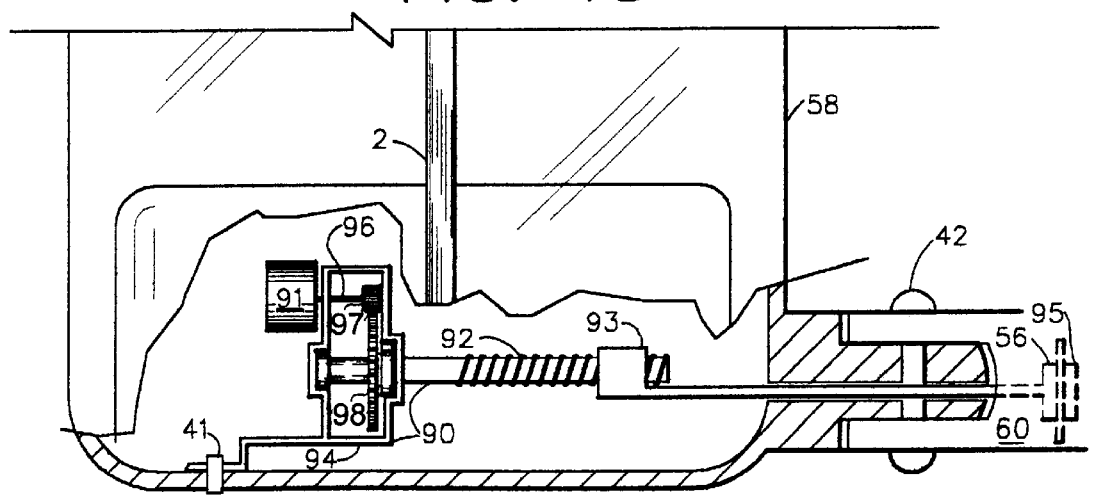
FIG. 13 is a front partial cut-away view of the mirror assembly showing the single adjuster located in the lower section of the mirror assembly.
Figures 1, 14A:
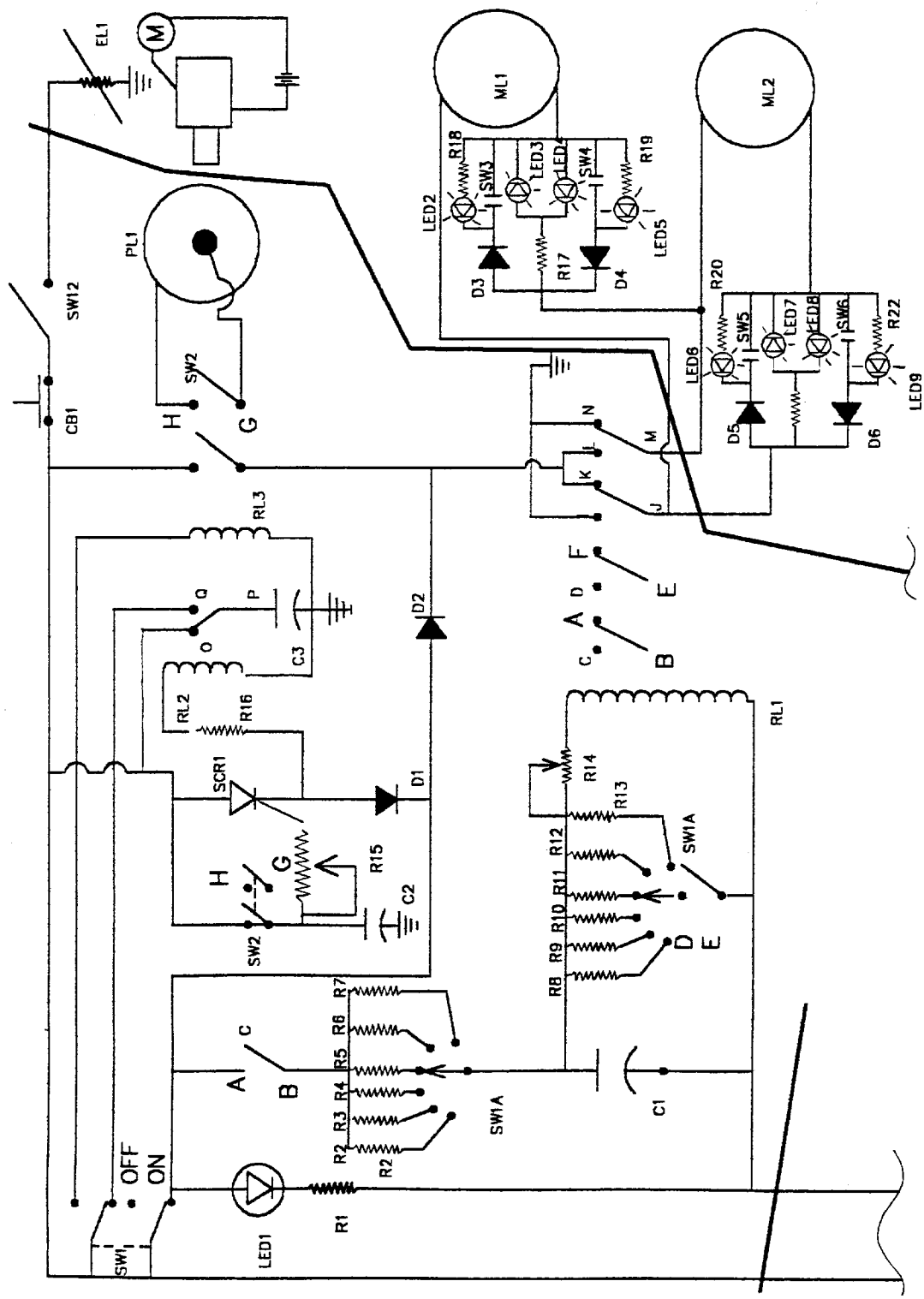
FIG. 14a is an electrical schematic for both mirror controls.
Figures 2, 14A:
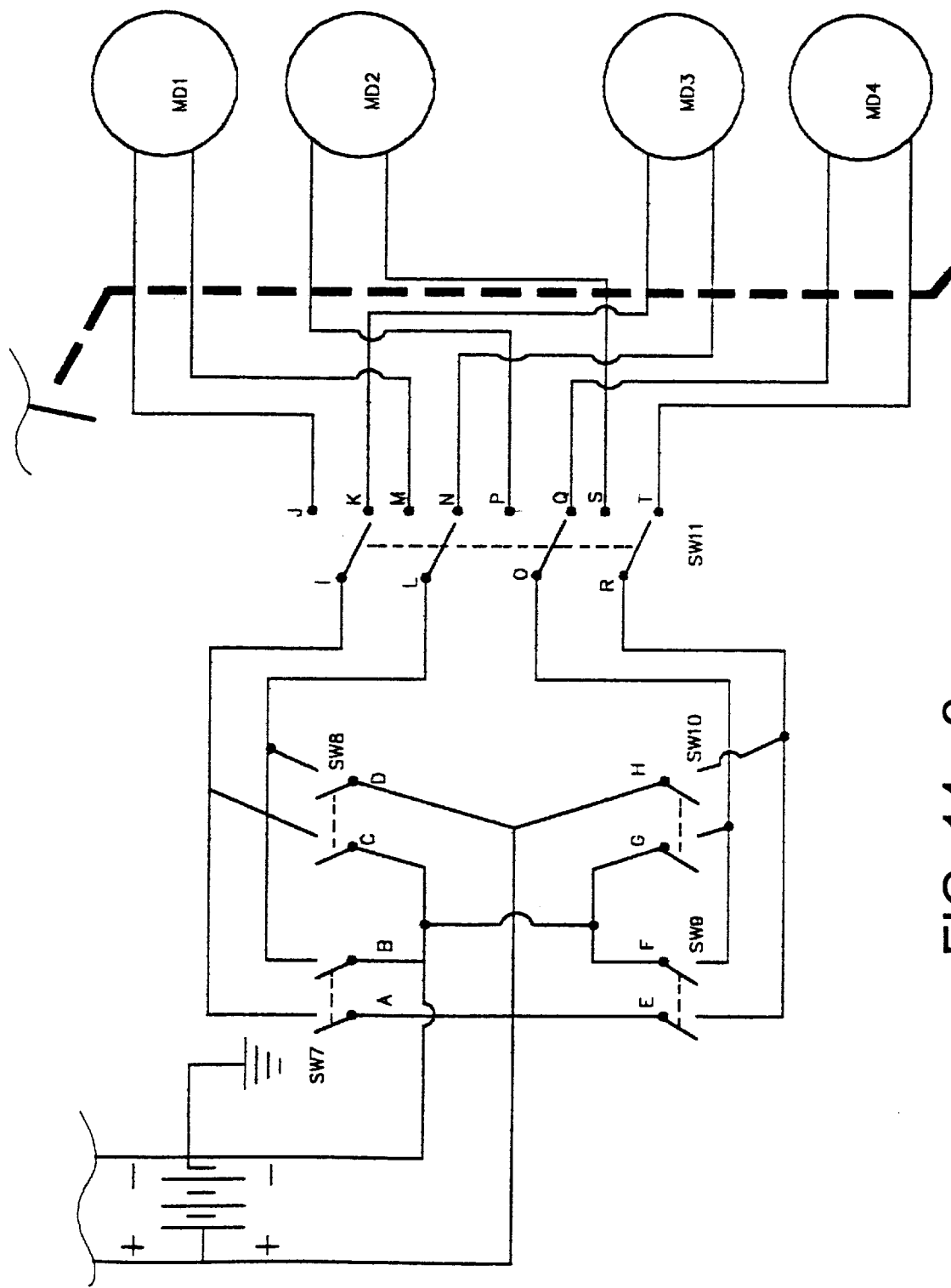
Figure 14B:
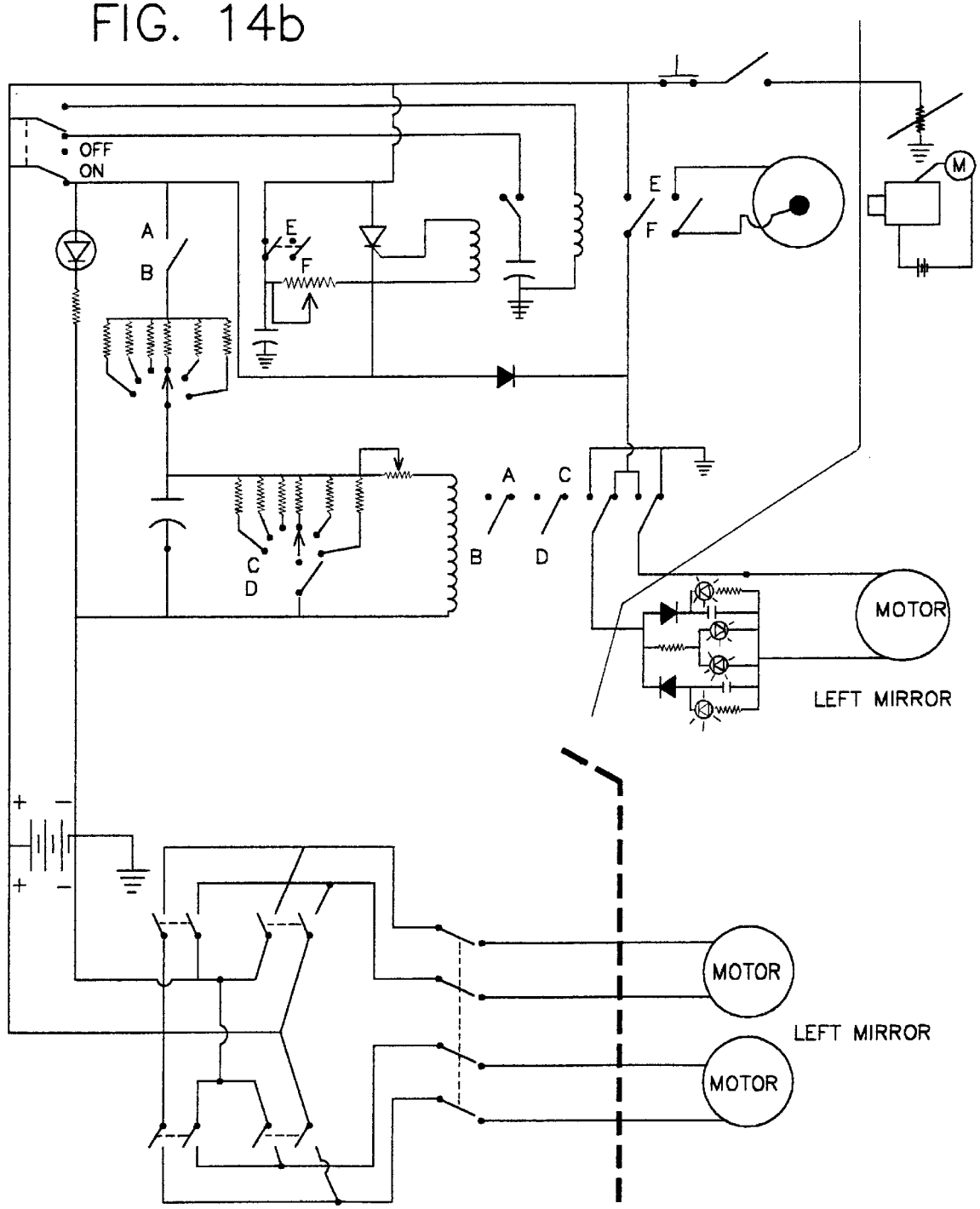
FIG. 14b is an electrical schematic of the power control for the wiper assembly for a single mirror.
Figure 14C:
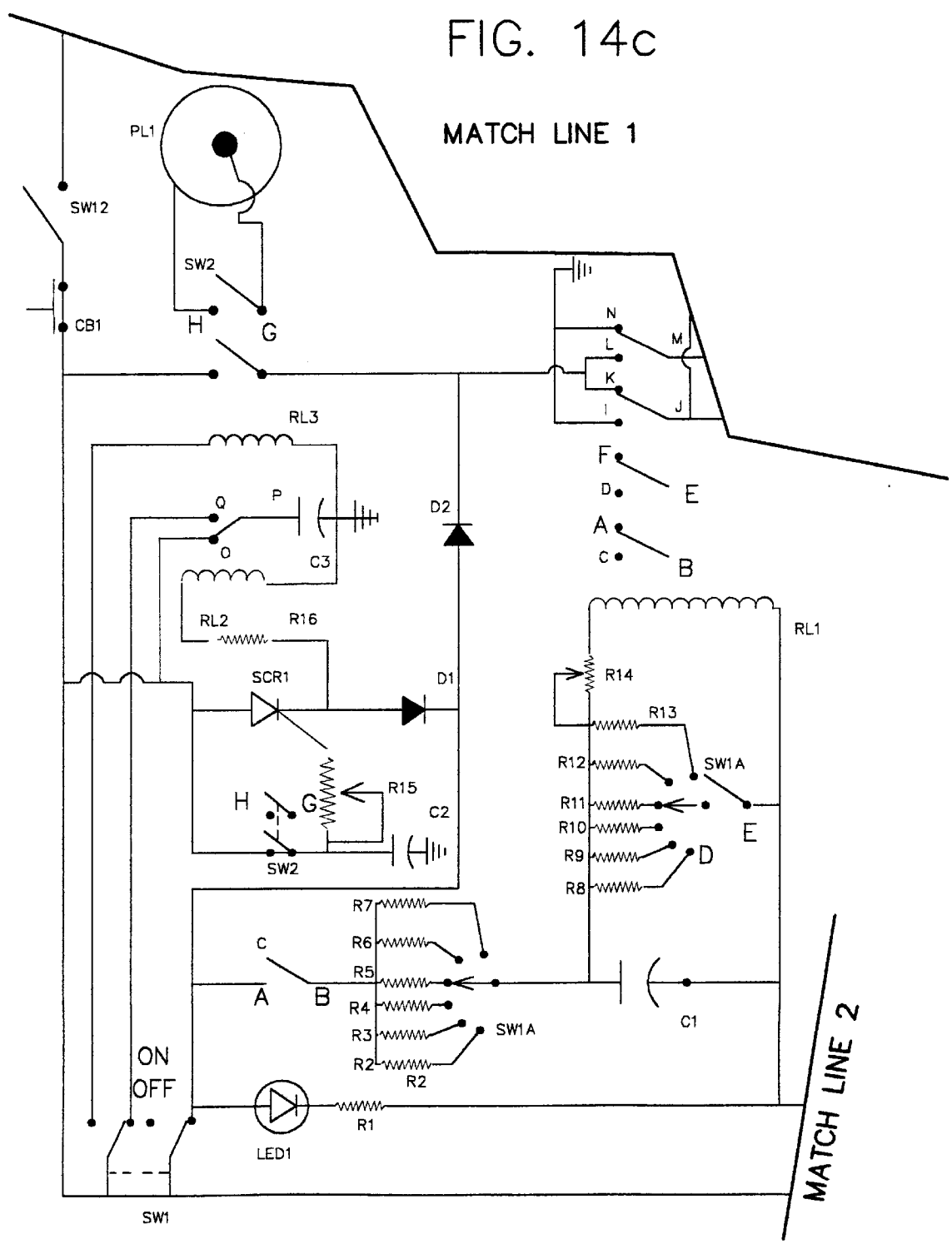
Figure 14D:
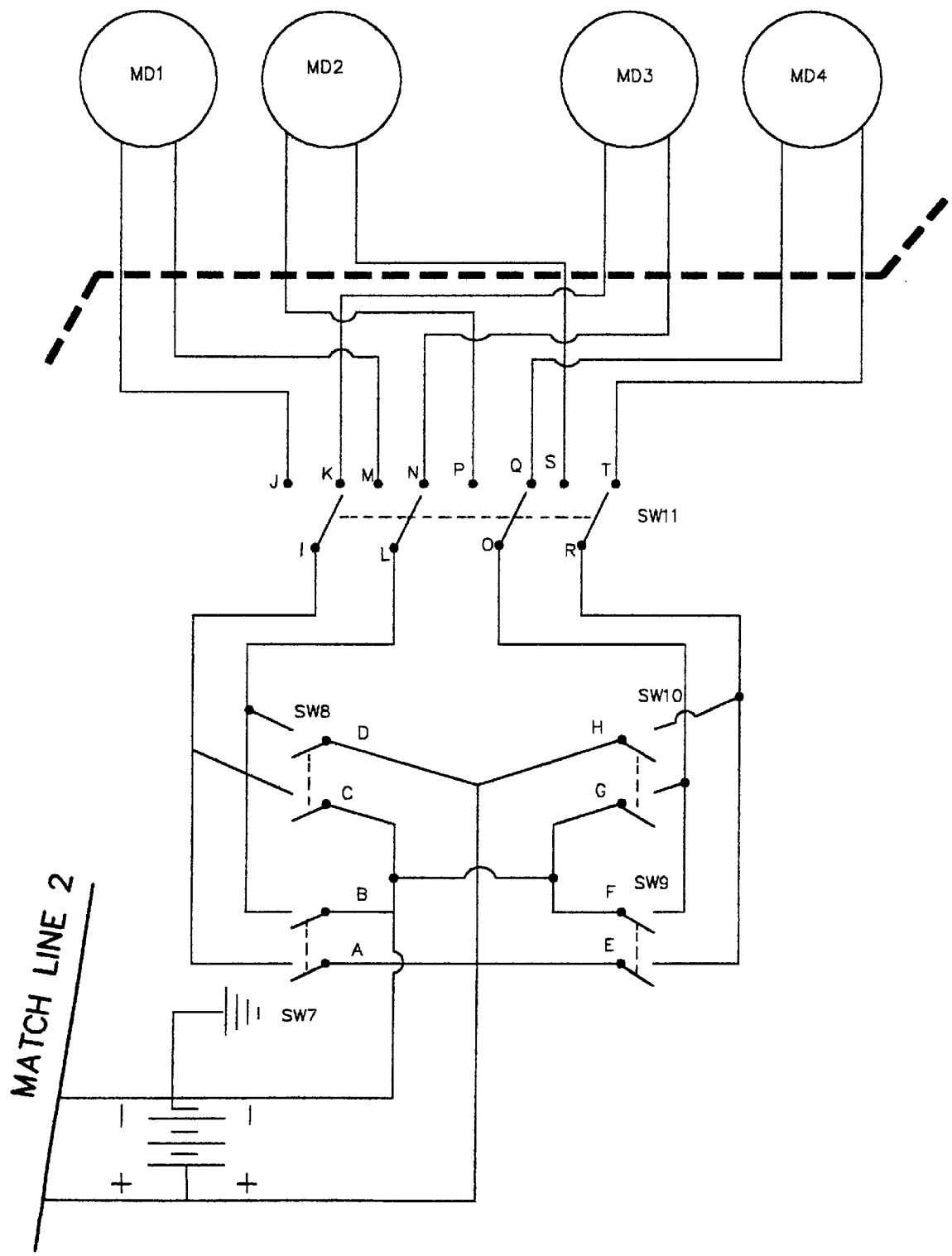
Figure 14E:
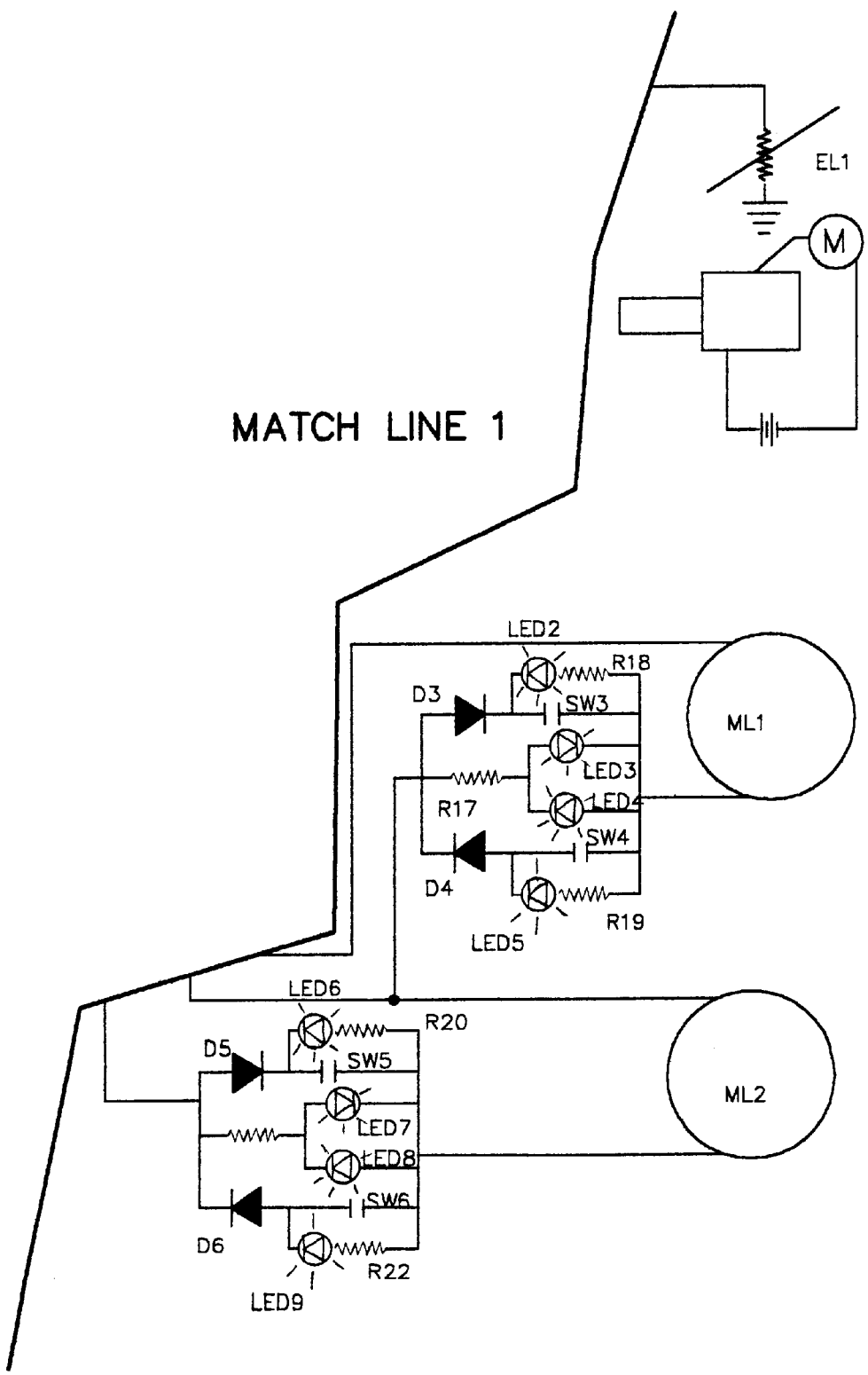

Turning now to FIGS. 12–13, an adjuster 90 is located in the lower half of a mirror assembly 58. This embodiment does not contain the adjusters from the previously described. This adjuster is connected to three points, two located in the arm 60 extending to the vehicle (42, 56) and the other point (41) within the mirror assembly. This allows the entire mirror assembly to be moved in or out.

As an alternate to the spirally threaded shaft connected to a motor which provides bi-directional movement discussed previously herein, a helically threaded shaft 50 may be used to provide bidirectional lateral movement while rotating the shaft only in one direction (FIG. 15). The helically threaded shaft 50 incorporates both ascending and descending spiral grooves. Reversing grooves are positioned on opposite ends of the helically threaded shaft 50 so that the grooved member which meshes with the helically threaded shaft 50 may laterally reverse directions (i.e., move from the ascending to the descending grooves) without having to change the rotational direction of the shaft. This alternate type of shaft may be substituted for any of the spirally threaded shafts used with bi-directional motors, for example, the spirally threaded shaft 15a which meshes into a grooved connector arm 15b, for adjustment of the mirror; or the threaded shaft rods 9 which mesh with the wiper arm base 8, for driving the wiper.

FIGS. 14a–14e illustrate the electrical circuitry described below.

Switch SW1 is in/off switch in the on position, current flows through the contact of RL2 to charge up capacitor C3 to a hold state, current also flows to light emitting diode LED2 on the eliminate on/off indicator. Current also flows from switch SW1 through the contacts of RL1 through Resistor Array R2 to R7 off different values selected by switch SW1A upper half to charge up capacitor C1. Capacitor C1 charges at a period of time determined by the amount of resistance obstructing the current flow to capacitor C1 that is selected by the upper half of switch SW1A. Capacitor C1 charges to activating values of RL1 resistor RL4 is used to adjust the Activating Range of RL1 charging cycle.

Once the activation value of RL1 is reached, the RL1 reacts, contacts A-B open and current stop flow to capacitor C1. Capacitor C1 discharges contact D-E are closed that allows current to flow, not only through the coil of RL1 but also a shunt path, through the Resistor Array R8 and R13 and the lower half of switch SW1A, capacitor C1 discharges at a period of time determined by the amount of resistance charge and discharge rate simultaneously once capacitor C1 has discharged to RL1 activates value ends. The discharge cycle RL1 returns to a resetting state, contact D and E open contact A and B close and the circuit starts another charging cycle.

During the charge cycle RL1 is in a reset state, contacts J-K and M-N are closed, current flows from switch SW1 through diode D2, D2 is used as protection from inverse voltages and spikes. The current travels through contacts J-K through switch diodes D3–D5 blocked by diodes D4–D6 as current travels to LED 3 and LED 7 to eliminate Directional Travel Indicators and also across safety contacts switches SW3 and SW5 to active motors ML2 and ML1 into motion. Motor ML1 and ML2 will drive until the charging cycle and RL1 changes states or safety contacts SW3 and SW5 is reached and open the circuit, stopping the current flow motion of motors ML1 and ML2. ML1 and ML2 will remain until the end of the charging cycle. A small current bypass switches SW3 and SW5 are used to eliminate LED2 and LED6, the stop indicator.

During the discharge cycle, relay RL1 is in active state, contact I-J and L-M are closed, electrical current flows from switch SW1 through diode D2 to switch diodes D4 and D6 blocked by D3 and D5. Current travels to LED4 and LED8 to eliminate the reverse Directional Travel Indicator, and also across safety contacts SW4 and SW6 reached and open. The current stops the motion of motors ML1-ML2. ML1 and ML2 will remain stopped until the beginning of the next cycle where a small current bypasses switches SW4 and SW6 to eliminate LED3 and LED9, the stop indicators.

Switch SW1 after being on is then placed in off position and a circuit path is connected from capacitor C3 which is in a full charge state through the coil of RL3-C3 discharged through the coil of RL3 that closes its contact, which applies current to the contact of RL1. RL1 in its rest state contacts switches K-J; M-N are closed, and the current flows through D3 and D5 driving ML1 and ML2 until safety contact SW3 and SW5 are reached to open the circuit to permanent state of rest. During the return cycle diode D2 blocks current from activating the control sequences of the circuit.

Switch SW2 controls the automatic function. Switch SW2 is normally an open switch with two poles. When closed, switch SW2 allows a closed circuit from the battery washer motor to ground to plug PL1. This tells the pump to spray water momentarily. Closing switch SW2 also applies a charge to capacitor C2. The switch SW2 is thereafter released and reopens capacitor C2 which discharges through R15 to the gate of SCR1. That in turn activates SCR1 and applies operating current to the control sequences and drives circuits. The system will operate until capacitor C2 discharges to a value that is not enough to keep SCR1 open.

As the last current flows through SCR1, current also activates RL2 that applies the hold current to capacitor C3 through contacts O-P of RL2. C3 is charged up for the return cycle. When SCR is turned off, current to the system stops operating, RL2 goes back to a rest state, contacts are closed connecting a discharge path from capacitor C3 across RL2. Contacts Q-P across, off switch SW1 to the coil of RL3. That closes it, contacts that applies current to contact of RL1 to start the return cycle.

Direction Control Circuit is described as follows:

Switches and motors SW7, SW8, SW9, SW10, SW11, MD1, MD2, MD3, MD4, SW7 AND SW8 are monitory two pole switches that control the right or left travel. Current flows from positive through contacts and then SW11 contacts I-H to activate motor MD3 and back to switch SW11 then contacts L-N then back to ground through SW7, and contact B. When SW8 is pushed, current flows from positive contact D through SW11, and contact L-N through MD3, and then back through SW11, and contact I-K to ground through SW8 contact C. Switches SW9 and SW10 are momentary two pole switches that control the up and down travel. When SW9 is pushed, current flows through SW9 positive contact E through SW11 contact R-T activating MD4 then back through SW11 contact O-Q back to ground through SW9 contact F. This drives MD4 up. When SW10 is pushed, current flows through positive contact H, through SW11, T-R, to place MD4 into motion, then flows back to SW11, Q-O, back to ground through SW10 contact G.

SW11 is a four pole, two position, switch. In its present position, motors MD3 and MD4 are activated with SW7 through SW10 when pushed for adjusting the mirror. When SW11 is switched over, contacts J-M and P-S are used in conjunction with MD1 and M2 for adjusting the right mirror, when switch SW7, SW8, SW9, SW10 is pushed.

Mirror Heating is described as follows:

When SW12 is closed, current is supplied to one Resistive Heating Element; EL1. CB1 is a circuit breaker that acts as a thermostat that limits the time and amount of current to EL1. CB1 will open and close causing ELI to heat and cool at a balance rate until S12 is open.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. An exterior rearview mirror assembly for use on a vehicle, comprising:
    a) a rearview mirror;
    b) a wiper assembly attached to said rearview mirror comprising a wiper arm base located substantially behind said mirror and extending over a top edge of said mirror to engage a top edge of a substantially resilient wiper arm having at least one flexible wiper blade alone the length thereof for wiping said rearview mirror, wherein a bottom edge of said wiper arm remains free;
    c) a driver means for bidirectionally driving said wiper arm base which in turn drives said wiper blade across said mirror; and
    d) a bidirectional moveable means, wherein said wiper arm base is attached to said bidirectional moveable means driven by said driver means, wherein said bidirectional moveable means comprises at least two rods inserted through two corresponding holes in said wiper arm base, whereby said rods provide vertical stability to said wiper arm base thereby vertically aligning said wiper arm with said mirror; wherein at least one of said rods is a spirally threaded rod and its corresponding hole is counter-threaded.

2. The mirror assembly of claim 1 wherein said mirror comprises at least one flat reflective surface and at least one convex reflective surface; said rearview mirror having a substantially flat exposed outer surface over said reflective surfaces and wherein said convex reflective surface and said flat reflective surface are made from a single piece of translucent material with a reflective coating applied to an underside thereof.

3. The mirror assembly of claim 1 wherein said mirror comprises at least one flat reflective surface and at least one convex reflective surface; said rearview mirror having a substantially flat exposed outer surface over said reflective surfaces and wherein said convex reflective surface is mounted along the same plane as said flat reflective surface, and wherein a single piece of translucent material extends over said reflective surfaces to provide said substantially flat outer surface.

4. The mirror assembly of claim 1 wherein said bidirectional moveable means comprises at least one spirally threaded rod inserted through a counter-threaded hole within said wiper arm base, wherein said threaded rod meshes into a worm gear meshed to a worm of said driver means thereby translating bidirectional rotation of said worm to said rod, causing said wiper arm base to traverse across said rod.

5. The mirror assembly of claim 4 wherein a pair of contacts are mounted along said rod near each end of said rod such that upon said wiper arm base reaching either end while traversing said rod, one of said contacts is activated, causing said driver means to reverse direction of said gear means, thereby reversing rotational direction of said rod and reversing direction of said wiper arm base, periodically causing said blade attached thereto to traverse back and forth across said flat outer surface in a wiping manner.

6. The mirror assembly of claim 1 wherein said threaded rod meshes into a worm gear meshed to a worm of said driver means thereby translating bidirectional rotation of said worm to said rod, causing said wiper arm base to traverse across said rod.

7. An exterior rearview mirror assembly for use on a vehicle, comprising:

a rearview mirror; a wiper assembly attached to said rearview mirror; and mirror adjustment means for adjusting the angular position of the mirror comprising a pair of adjusters located at right angles from a pivot point to provide both horizontal angular movement and vertical angular movement from said pivot point, and wherein each of said adjusters comprises a spirally threaded rod inserted through a counter-threaded hole of a connector arm attached to said mirror; a drive means attached to a stationary point of said mirror assembly to provide bidirectional rotational movement to said rod, such that said connector arm laterally traverses said rod upon rotation of said rod in opposing directions depending on the rotation direction of said rod, thereby pushing or pulling said mirror about said pivot point to change the angular position of said mirror, and wherein said drive means for each adjuster comprises a belt driven gear attached to a single bidirectional motor means to provide rotation to each drive means which in turn provide bidirectional rotation to said rods.

8. An exterior rearview mirror assembly for use on a vehicle, comprising:

a rearview mirror; a wiper assembly attached to said rearview mirror; and mirror adjustment means for adjusting the angular position of the mirror, wherein said mirror adjustment means comprises an adjuster mounted to one side of a pair of vertically aligned pivot connectors to provide vertical angular adjustment of said mirror and wherein said adjuster comprises a spirally threaded rod inserted through a counter-threaded hole of a connector arm attached to said mirror; and a drive means attached to a stationary point of said mirror assembly, said drive means providing bi-directional rotational movement to said rod, such that said connector arm laterally traverses said rod upon rotation of said rod in opposing directions depending on the rotational direction of said rod, thereby pushing or pulling said mirror about said pivot connectors to change the angular position of said mirror.

9. An exterior rearview mirror assembly for use on a vehicle, comprising:

a rearview mirror; a wiper assembly attached to said rearview mirror; and mirror adjustment means for adjusting the angular position of the mirror, wherein said adjustment means comprises an adjuster attached to said mirror assembly and a connector arm attached to an external mount of said mirror assembly and a stationary pivot point at the point where said mirror assembly attaches to said external mount; said adjuster comprising a spirally threaded rod inserted through a counter-threaded hole of said connector arm, said adjuster further comprising a drive means to provide bidirectional rotational movement to said rod, such that said connector arm laterally traverses said rod upon rotation of said rod in opposing directions depending on the rotational direction of said rod, thereby pushing or pulling the entire mirror assembly about said pivot point in said external mount to change the angular position of said mirror assembly.

* * * * *

UNITED STATES PATENT AND TRADEMARK OFFICE
CERTIFICATE OF CORRECTION

PATENT NO. : 6,032,323
DATED : March 7, 2000
INVENTOR(S) : Darrel L. Smith, Donnie Knight It is certified that error appears in the above-indentified patent and that said Letters Patent is hereby corrected as shown below:

Column 1, line 66: "mirror. a" should read --mirror; a--.

Column 2, line 6: "thereof In" should read --thereof. In--.

Column 4, line 39: "connector pivot point)" should read --connector (pivot point)--.

Column 5, line 18: "FIG. 14a" should read --Figures 14a-1 and 14a-2--.

Column 6, lines 15-16: "laminated A" should read --laminated. A--.

Column 10, line 35: "alone" should read --along--.

Signed and Sealed this

Third Day of April, 2001

*Attest:*

NICHOLAS P. GODICI

*Attesting Officer*   *Acting Director of the United States Patent and Trademark Office*